INVENTORS R.C. FLETCHER
S. MILLMAN
BY
ATTORNEY

June 25, 1957   R. C. FLETCHER ET AL   2,797,362
MAGNETRONS

Filed April 13, 1953   2 Sheets-Sheet 2

π MODE FREQUENCY

π MODE FREQUENCY

π MODE FREQUENCY

INVENTORS R. C. FLETCHER
S. MILLMAN
BY
ATTORNEY

United States Patent Office 2,797,362
Patented June 25, 1957

2,797,362

MAGNETRONS

Robert C. Fletcher, Chatham, and Sidney Millman, Orange, N. J., assignors to Bell Telephone Laboratories, Incorporated, New York, N. Y., a corporation of New York Application April 13, 1953, Serial No. 348,438

6 Claims. (Cl. 315—39.65)

This invention relates to magnetrons and more particularly to the suppression of undesired modes of oscillation in resonant circuits of the type employed in magnetrons.

When oscillations start to build up in a resonant circuit comprising a ring of cavity resonators, as when a magnetron is pulsed, competition exists between the various possible modes of oscillation. It is customary to identify the different possible modes of oscillation which may exist in a magnetron resonator circuit by specifying for each the phase difference of the radio frequency voltage set up across successive anode slots. This phase difference is obtained by substituting integral values for $n$ in the formula $2n/N$=phase difference, measured in radians where N is the total number of resonators in the ring. For the case of $n=N/2$ the phase difference is $\pi$ radians and this mode is generally referred to as the $\pi$-mode. Other modes exist for which $n$ decrease in integral steps from $n=N/2$ and it is customary to identify these modes by the associated integral number.

Each of these modes tends to be excited by the rotating space charge in the cathode-anode space, the degree of excitation tending to be strongest when (1) the angular velocity of the space charge (determined mainly by the magnetic field and applied voltage) is equal to the angular phase velocity of the mode and when (2) the space charge has the same symmetry as the mode. The modes so excited, react back on the space charge to modulate it into a pattern tending to have the same symmetry as the mode. A measure of this reaction is the magnitude of the radio-frequency voltage appearing across the anode slots. For a given space charge excitation this R. F. voltage will be inversely proportional to the degree of "loading" for each mode. Thus the more heavily loaded a mode is the greater the difficulty it has getting started and the less stable it is likely to be against changes in load, voltage or cathode emission when it does get started. In order to get power out of a desired mode it is necessary to make it fairly heavily loaded. If another undesired mode happens to have almost the same phase velocity and it is lightly loaded, it tends to start quicker and have a greater stability and thus the magnetron may tend to operate in this undesired mode. This type of magnetron misbehavior has become known as "moding" and in pulsed magnetrons causes either partially missing or completely missing lines in the desired mode spectrum. A more complete discussion of the competition betwen the various modes at the start of the oscillation build up and of moding may be found in the chapter entitled "Transient behavior" by Reike in "Microwave Magnetrons" (Collins, Ed., M. I. T. Series, vol. 6) and at section 10.6 in the article "The magnetron as a generator of centimeter waves" by Fisk, Hagstrum and Hartman at page 253, vol. 25 of the Bell System Technical Journal (April, 1946).

Because of a variety of factors, including the ease of suitable strapping, the desired mode of operation is often the $\pi$-mode. The mode most likely to build up appreciable amounts of radio frequency energy or to oscillate in lieu of the $\pi$-mode is the mode nearest to it is frequency, which is the $(N/2)-1$ mode. This mode will be a doublet mode, the two components of which may be separated slightly in frequency and generally the two components will not be equally loaded. When one of the doublet components is heavily loaded and the other lightly loaded, oscillations may readily build up in the lightly loaded component and cause moding.

The optimum mode coupling occurs when there is equal tightness of coupling, i. e., equal loading for the two components of the $(N/2)-1$ mode in the output circuit, which is generally considered as the output resonator. This condition represents a small loss of coupling for the component which is ordinarily heavily loaded and a large increase for the lightly loaded component. Since each component mode has a particular orientation of its standing wave patterns, the requirement for mode coupling equalization reduces to orienting the standing wave patterns of the component modes in such a manner as to produce approximately equal current amplitudes at the output cavity.

The standing wave patterns can be fixed by the introduction of reactive disturbances at suitable points in the ring of resonators. Priorly asymmetries have been introduced to attain mode equalization by introducing breaks in the strapping of the magnetron. However, the disturbance introduced by a strap break has been found to be so violent as to interfere with the desired standing wave pattern of the $\pi$-mode.

It is an object of this invention to prevent moding in resonant circuits comprising a ring of resonators.

It is a further object of this invention to introduce asymmetries into the resonant circuit in a manner such that the amount of the asymmetry introduced may be readily and evenly controlled from zero up to a value so large as to be sufficient to orient the mode it is desired to suppress but insufficient to interfere with the main mode of oscillation.

It is a general object of this invention to improve the operation of magnetrons.

These and other objects of this invention are attained in accordance with one specific illustrative embodiment wherein disturbance or asymmetries are introduced specific distances from the output resonator by varying the diameter of the resonator bores at those specific distances. As all the resonator bores may readily be first machined to the same diameter in the anode block, the asymmetry is easily introduced in accordance with our invention by slightly enlarging the resonator bores at the scpecified points. Very accurate control of the amount of disturbance introduced is attainable as the diameter of the enlarged bores can be carefully controlled and may be increased any desired amount. In this manner the amount of disturbance can be carefully determined to be sufficient to properly orient the doublet components of the mode to be suppressed but not to interfere with the desired mode of operation.

The exact location in the ring of resonators of the resonator bores whose dimensions deviate from that of the other bores will depend on the number of resonators in the particular resonator circuit and on the circuit itself. The standing wave patterns of the components of a double mode of oscillation that it is desired to suppress differ in angular orientation by $$\frac{\pi}{2n}$$

radians so that one wave pattern will have its maxima and minima at points in the resonator circuit at which the other pattern has its zeros. In the absence of other resonator disturbances or asymmetries the two wave patterns will therefore have equal amplitudes at a point $$\frac{\pi}{4n}$$

radians from a given maximum and at points differing in angle from the above point by $$\frac{K\pi}{2n}$$

where K has integral values from 1 to 4n.

In accordance with a feature of this invention, the standing wave patterns are so oriented that the output resonator bore is located at one of the points of equal amplitude of the wave patterns by varying the dimensions of the appropriate resonator bores. An enlarged resonator bore tends to orient the components of the (N/2)−1 modes so as to produce in that bore a current maximum for one of the components and zero R. F. current for the other. When the proper bores are enlarged one can thus orient the component patterns so as to produce equal current amplitudes for both components at the output cavity. Actually, however, because of additional disturbances introduced by small asymmetries in the resonant circuit and by the output circuit itself, the disturbance produced by the enlargement of the appropriate bores has to be made large enough to dominate the mode orientation.

In one specific illustrative embodiment wherein N, the number of resonators in the resonant system, was 16, the π-mode corresponds to $n=8$ and the seven-mode was closest in frequency to the π-mode, being about +13 percent above the frequency of the π-mode. In this specific embodiment, the reactance introduced by the output circuit was ignored as being of secondary importance and the disturbances were introduced into the resonant circuit by enlarging the second and tenth resonator bores from the output bore, these bores being located exactly 45 degrees or $$\left(\frac{\pi}{4n}+\frac{3\pi}{2n}\right)$$

radians and 225 degrees or $$\left(\frac{\pi}{4n}+\frac{17\pi}{2n}\right)$$

radians from the output bore.

In another specific embodiment in which a 16-resonator system was again employed but an appreciable reactance was introduced by the output circuit in the output resonator bores, the third and eleventh resonator bores were enlarged, these bores being 67½ degrees and 247½ degrees from the output resonator bore. In this embodiment the reactive disturbance introduced by the output and the disturbances introduced into the resonant system by the enlarged resonator bores may be adjusted to have a net effect such that the standing wave patterns are located with their current maxima as described.

When the reactance introduced by the output, particularly that introduced by the output transformer between the output resonator and the associated wave guides, is considered and introduced as an additional condition into the general equations, the position of the disturbance is changed and may more nearly approximate different resonator bores than when the output reactance was ignored.

It is a feature of this invention that disturbances or asymmetries be introduced into a resonator system by varying the dimensions of particular resonant cavities.

It is a further feature of this invention that the particular cavities whose paricular dimensions vary from the constant dimensions of the remaining cavities depend upon the particular doublet mode it is desired to suppress, the number of resonant cavities, and the importance or absence of reactances external to the resonant system, such as the possible importance of the reactance of an output transformer or output coupling from the resonant system.

It is a still further feature of this invention, in devices wherein the resonant cavities comprise resonator bores in a conductive block that the disturbance be introduced by varying the diameter of particular resonator bores and specifically by enlarging the diameter of these particular bores.

A complete understanding of this invention and of these and various other features thereof may be gained from consideration of the following detailed description and the accompanying drawing, in which.

Figure 3:
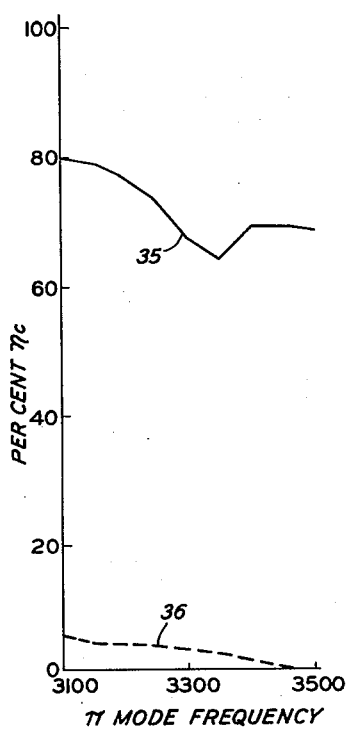
Figure 4:
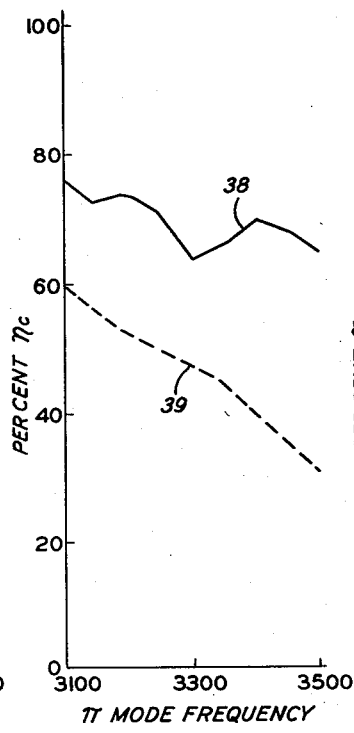
Figure 5:
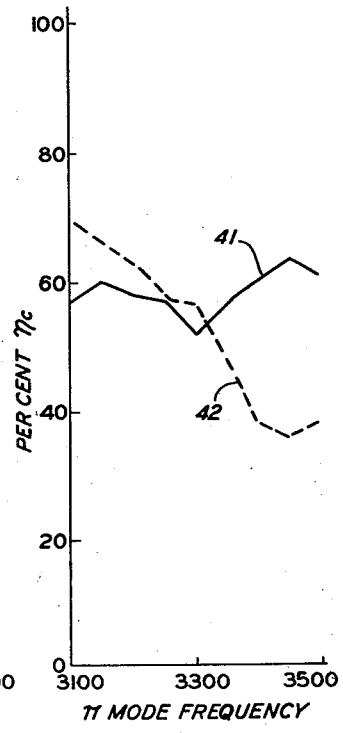

Fig. 3 is a graph depicting the percent loading, as measured by the percent circuit efficiency, for the doublet components of the mode closest to the π-mode for a resonant system in accordance with the prior art; and Figs. 4 and 5 are graphs depicting the percent loading for the doublet components of the mode closest to the π-mode for a resonant system in accordance with two specific embodiments of this invention.

Turning now to the drawing, the magnetron therein illustrated is of the type fully described in Patent 2,657,334, issued October 27, 1953, of J. W. West and comprises an anode 1 having an axial bore 11 and a plurality of cavity resonator bores 12 and 13 equally spaced in a circular array around the axial bore 11 and communicating therewith. A cathode 15 comprising a cylindrical sleeve having an electron emissive coating thereon is positioned within the axial bore 11 and supported by the supporting cylinder 16. Tuning pins 17 extend into the cavity resonator bores 12 and 13 and are axially insertable therein by a tuning mechanism 20. A cylindrical tuning head choke 21 is mounted by the pole piece 22 and cooperates with the tuning pin carrier member 23 as to prevent power loss into the tuning head cavities as more fully described in the above-mentioned West patent.

Energy from the magnetron is advantageously transmitted from one of the cavity resonator bores through a wave guide system comprising a first H-section or dumbbell shaped transformer 25, a second transformer 26 and a matching member 27 the output dimensions of which match the dimensions of the external wave guide which may be attached to a metallic coupling member 29 as by the threaded portion 30.

Figure 2:
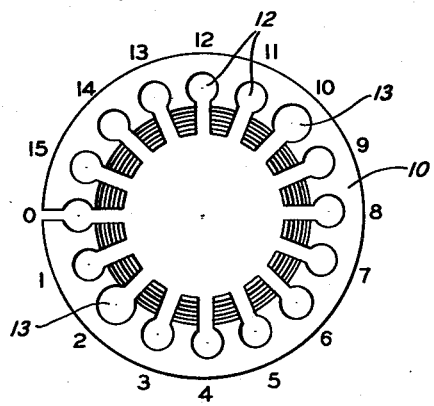
Fig. 2 is a plan view of the anode of the magnetron of Fig. 1 illustrating one specific embodiment of this invention.

Referring now to Fig. 2, there is shown a plan view of the anode 10. As can be seen in this specific embodiment of this invention the number of resonators in the resonant system is sixteen and they have been numbered from 0, the output resonator, to 15. In accordance with one aspect of our invention, a carefully controlled amount of disturbance is introduced into a resonant system by varying the dimensions of certain of the resonator bores. In the specific embodiment depicted the resonator bores 13 comprising the No. 2 and No. 10 resonators located 45 degrees and 225 degrees from the output resonator are enlarged to increase their inductance over that of the other fourteen resonators. By introducing relatively large reactances at these resonators, which reactances however, are insufficient to disturb the preferred π-mode of oscillation, the standing wave patterns for the doublet mode most likely to oscillate in place of the π-mode may be locked with their maxima and minima at preferred points.

The effect of the introduction of these disturbances on the loading of the doublet components of the 7-mode, which in this embodiment is the mode most likely to oscillate in place of the π-mode, can be seen from a comparison of Figs. 3 and 4. These figures are graphs showing the degree of loading as expressed in percent circuit efficiency, for the doublet components of the 7-mode, identified as 7a and 7b, the 7a component being the lower frequency component, plotted against the π-mode frequency for this specific embodiment. In Fig. 3 curve 35 represents the variations in the 7a component and curve 36 the variation in the 7b component with frequency for the prior art conditions wherein the resonator bores are all of the same dimensions. As can readily be seen the 7a component is quite heavily loaded whereas the loading on the 7b component is negligible.

Fig. 4 is a graph of the variations in the loading of the 7a component, indicated by curve 38, and the 7b component, indicated by curve 39, for a specific illustrative embodiment of this invention wherein the No. 2 and No. 10 resonator bores are enlarged and the output circuit designed to reduce the reactance introduced by it into the output resonator to negligible proportions. As can be seen the relative loading of the two components of the 7-mode is greatly improved.

Fig. 5 is a graph of the variations in the percent loading of the 7a component, indicated by curve 41, and the 7b component, indicated by curve 42 for a specific embodiment of this invention wherein the No. 3 and No. 11 resonator bores are enlarged. The reason these particular resonator bores are enlarged is that in addition to the reactances of the resonator system itself, account must be taken of the reactance introduced by the output transformer, which in this specific embodiment comprises the H-shaped section 25, the intermediate section 26, and the matching member 27 in cases in which that latter reactance is not negligible. This transformer reactance also varies with frequency. In the specific embodiments tested and from which data for these graphs was taken we found that the reactance introduced by the output transformers was very small at the low frequency end of the π-mode frequency band but increased with frequency, and that asymmetries introduced in the No. 2 and No. 10 resonator bores would cause the loading of the 7a component, as measured by circuit efficiency, to be quite good at the lower frequency end of the band but to decrease rapidly as the frequency is increased as seen in Fig. 4. However, we found that if the No. 3 and No. 11 resonators are enlarged a suitable amount there will be one frequency in the band at which the conditions for exact equal loading of the two components of the 7-mode will exist. As can be seen in Fig. 5 at frequencies lower than the match frequency the 7a component is more heavily loaded than the 7b component while at high frequencies the reverse is true.

In order to attain substantial equality of loading of the two 7-mode components over the entire frequency band the reactance of the output transformer may be effectively cancelled out by reactances introduced in other resonators. As further described in application Serial No. 348,365 filed April 13, 1953 by M. C. Glass and application Serial No. 348,218, filed April 13, 1953 by J. P. Molnar this frequency variable reactance to very nearly cancel the transformer reactance over the whole operating band of frequencies may be introduced by variations in the tuning pin structures in specific resonator bores.

Figure 1:
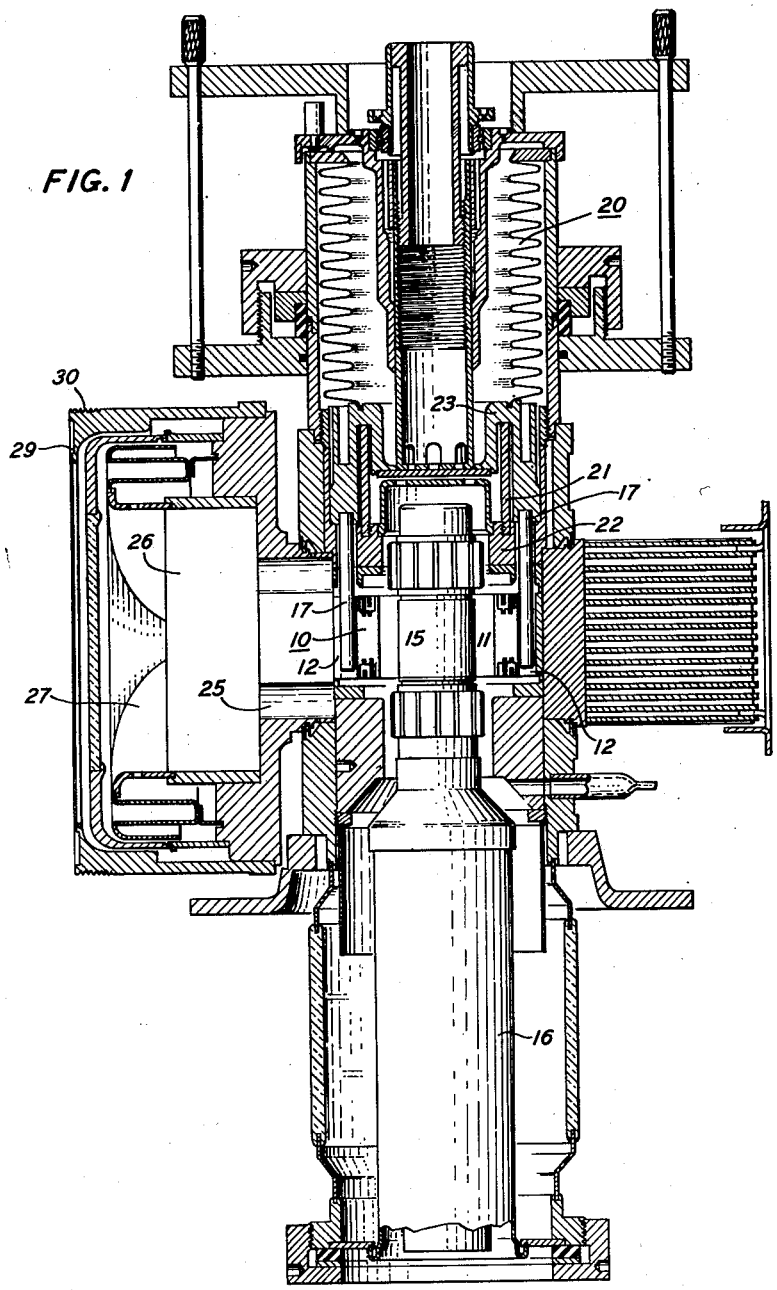
Fig. 1 is a sectional view of a magnetron in which this invention may be incorporated.

An appreciation of the variation in resonator bore diameter to attain equal loading of the doublet mode in accordance with this invention can be attained from reference to particular embodiments constructed in accordance with Fig. 1 and on which the data for Figs. 3, 4 and 5 were based. In these embodiments the regular bore diameter was 0.236 inch while in the embodiments in which the No. 3 and No. 11 bore were enlarged, the No. 3 and No. 11 bores were 0.259 inch. In the other embodiments in which the No. 2 and No. 10 bores were enlarged, these bores were 0.250 inch.

While the above-described arrangements are illustrative of the application of the principles of this invention, it is to be understood that this invention is not limited thereto and specifically that appropriate reactance variations may be introduced into the resonators by decreasing rather than increasing the diameters of specific bores, though the described structure has certain manufacturing advantages. Similarly this invention is not limited to any particular type resonator structure but is applicable equally to resonant circuits employing bores, as described, slots, or vanes. Additionally, this invention is not limited in the number of resonator cavities employed or the particular doublet mode to be suppressed. Thus numerous other arrangements may be devised by those skilled in the art without departing from the spirit and scope of the invention.

Reference is made to an application, Serial No. 348,526 filed April 13, 1953 of M. S. Glass and L. R. Walker wherein a related invention is described and claimed.

What is claimed is:

1. A magnetron comprising anode means defining a plurality of resonant cavities and a central cavity communicating therewith, a cathode positioned in said central cavity, and means associated with one of said resonant cavities for the transfer of energy therefrom, each of said plurality of resonant cavities being dimensionally equal and having the same resonant frequency except for two of said resonant cavities, the first of said two cavities being positioned substantially $$\left(\frac{\pi}{4n}+\frac{K\pi}{2\pi}\right)$$

radians from said transfer resonant cavity and the other of said two cavities being diametrically opposite said first, $n$ being the mode number of a particular mode of oscillation of said magnetron to be suppressed and K having any integral value from 1 to $4n$.

2. A magnetron comprising an anode having therein a central aperture and a plurality of cavity resonator bores disposed thereabout parallel to and communicating with said central aperture, a cathode in said central aperture, and energy transfer means associated with one of said bores for the transfer of energy from said magnetron, each of said plurality of bores being dimensionally equal and having the same resonant frequency except for two of said bores positioned from said one bore such that the standing wave voltages are of substantially equal amplitude adjacent said one bore for a particular mode of oscillation of said magnetron to be suppressed, a first of said two bores being positioned substantially $$\left(\frac{\pi}{4n}+\frac{K\pi}{2n}\right)$$

radians from said one bore and the other of said two bores being diametrically opposite said first bore, $n$ being the mode number of the mode of oscillation to be suppressed and K having any integral value from 1 to $4n$.

3. A resonant circuit comprising conductive means defining a plurality of resonant cavities arranged in a circular array, energy transfer means associated with one of said cavities, and means providing equal loading of the doublet components of a mode of oscillation of said circuit, said last-mentioned means comprising portions in each of said cavities dimensionally equal except for two of said cavities specifically positioned from said one cavity for suppression of said mode of oscillation, a first of said two cavities being positioned substantially $$\left(\frac{\pi}{4n}+\frac{K\pi}{2n}\right)$$

radians from said one cavity and the other of said two cavities being diametrically opposite said first cavity, $n$ being the mode number of said mode of oscillation to be suppressed and K having any integral value from 1 to $4n$.

4. A magnetron comprising an anode having a central aperture therein and a plurality of cavity resonator bores therein disposed about parallel to and communicating with said central aperture, a cathode in said central aperture, and energy transfer means associated with one of said bores for the transfer of energy from said magnetron, each of said bores being dimensionally equal and having the same resonant frequency except two of said bores positioned with respect to said one bore to equalize the loading of the doublet components of a particular mode of oscillation other than the $\pi$-mode.

5. A magnetron in accordance with claim 4 wherein said two bores are of larger diameter than said other bores.

6. A magnetron comprising an anode having a central aperture therein and sixteen cavity resonator bores therein disposed about parallel to and communicating with said central aperture, a cathode in said central aperture, and energy transfer means associated with one of said bores for the transfer of energy from the magnetron, each of said bores being dimensionally equal and having the same resonant frequency except for said bores positioned 45 and 225 degrees from said one bore whereby loading of the doublet components of the 7-mode of oscillation of said magnetron is more nearly equalized.

References Cited in the file of this patent

UNITED STATES PATENTS 2,582,185    Wilshaw _____ Jan. 8, 1952